US010684479B2

(12) United States Patent
Chen

(10) Patent No.: US 10,684,479 B2
(45) Date of Patent: Jun. 16, 2020

(54) HEAD-MOUNTED PERSONAL MULTIMEDIA SYSTEMS AND VISUAL ASSISTANCE DEVICES THEREOF

(71) Applicant: VRVAORIGIN VISION TECHNOLOGY CORP. LTD., Taipei (TW)

(72) Inventor: Hsin-Yang Chen, Taipei (TW)

(73) Assignee: VRVAORIGIN VISION TECHNOLOGY CORP. LTD., Taipei (TW)

( * ) Notice: Subject to any disclaimer, the term of this patent is extended or adjusted under 35 U.S.C. 154(b) by 210 days.

(21) Appl. No.: 15/621,852

(22) Filed: Jun. 13, 2017

(65) Prior Publication Data
US 2017/0363873 A1    Dec. 21, 2017

(30) Foreign Application Priority Data

Jun. 15, 2016  (TW) .............................. 105118695 A
Sep. 7, 2016   (TW) .............................. 105128987 A

(51) Int. Cl.
G02B 27/14    (2006.01)
G02B 27/01    (2006.01)

(52) U.S. Cl.
CPC ..... G02B 27/0172 (2013.01); G02B 27/0179 (2013.01); G02B 2027/0178 (2013.01); G02B 2027/0185 (2013.01); G02B 2027/0187 (2013.01)

(58) Field of Classification Search
CPC ................................................. G02B 27/0172
USPC ......................................................... 359/630
See application file for complete search history.

(56) References Cited

U.S. PATENT DOCUMENTS

| 6,456,262 | B1 | 9/2002 | Bell |
| 7,594,727 | B2 | 9/2009 | Hillis et al. |
| 8,487,838 | B2 | 7/2013 | Lewis et al. |
| 9,122,321 | B2 | 9/2015 | Perez et al. |
| 2009/0237355 | A1 | 9/2009 | Orion et al. |
| 2010/0079356 | A1 | 4/2010 | Hoellwarth |
| 2012/0127422 | A1* | 5/2012 | Tian ............... G02B 7/365 351/158 |
| 2015/0235439 | A1 | 8/2015 | Schowengerdt |
| 2015/0253574 | A1 | 9/2015 | Thurber |

FOREIGN PATENT DOCUMENTS

| CN | 205038406 | 2/2016 |
| CN | 205103492 | 3/2016 |

OTHER PUBLICATIONS

Lanman, et al., "Near-Eye Light Field Displays", ACM Transactions on Graphics (TOG) 32.6 (2013): 220, pp. 1-10.

* cited by examiner

Primary Examiner — James C. Jones
(74) Attorney, Agent, or Firm — Liu & Liu

(57) ABSTRACT

Disclosed are head-mounted personal multimedia systems and visual assistance devices thereof, which are featured with a diopter adjustment unit to configurably provide various diopters for the user's eye(s) to watch. In order to watch clearly the picture displayed by a fixed-range display surface, the user's eyes can perform physiological accommodation movements in response to the diopters dynamically configured by the diopter adjustment unit, so that the eye fatigue could be prevented.

15 Claims, 13 Drawing Sheets

HEAD-MOUNTED PERSONAL MULTIMEDIA SYSTEMS AND VISUAL ASSISTANCE DEVICES THEREOF

This application is based on and claims the benefit of priority from Taiwan Patent Application 105118695, filed on Jun. 15, 2016 and Taiwan Patent Application 105128987, filed on Sep. 7, 2016.

BACKGROUND OF THE INVENTION

Field of the Invention

The present invention relates in general to a head-mounted personal multimedia system and a visual assistance device, and more particularly, to a head-mounted personal multimedia system and a visual assistance device featuring a diopter adjustment unit to induce eyes of a user to perform physiological accommodation movements to alleviate eye fatigue, for example.

Description of the Prior Art

Head-mounted personal multimedia systems may be referred from Oculus Rift or HTC Vive. In additional to the above packaged products, there are modular products, such as Google Cardboard, which may be manually assembled with other accessories (e.g., a mobile phone) into a head-mounted personal multimedia system.

Technologies of head-mounted personal multimedia systems are currently constantly progressing. For example, for a visually impaired person, e.g., a person with myopia or hyperopia, glasses cannot be worn while using a current head-mounted personal multimedia system such as Oculus Rift. In response, the CN205038406 U or CN205103492 U discloses a similar solution, which features an optical focal adjustment portion for adjusting a focus to replace glasses of a user, so as to adapt to applications of different visually impaired individuals.

It should be noted that, one targeted technical issue and a corresponding solution brought up in the CN205038406 U or CN205103492 U of the prior art are that, when a user applies a current head-mounted personal multimedia system, assuming that the level of physiological accommodation movements of the user's eyes is restricted (e.g., due to myopia or hyperopia), if an image still cannot be clearly seen after performing physiological accommodation movements to the extremes, the user may again clearly see the image through an auxiliary refractive power provided by adjusting the optical focal adjustment portion that adjusts a focal length. Similarly, "Near-eye light field displays." ACM Transactions on Graphics (TOG) 32.6 (2013): 220, by Lanman, Douglas and David Luebke, also handles the issue of being unable to focus when an image in a head-mounted personal multimedia system is located too close to the eyes.

Further, for example, the US 20150235439 A1 discloses various solutions including a variable focus element (VFE).

Meanwhile, it should be noted that, a VFE device disposed outside a body causes an issue of a variable spectacle magnification as a focal length changes; that is, an image perceived by human eyes suddenly becomes big and suddenly becomes small. This causes obvious discomforts, or even leads to an issue of anisometropia.

SUMMARY OF THE INVENTION

A head-mounted personal multimedia system and a visual assistance device are provided according to an aspect of the present invention.

In general, when a person views an object, a focal length needs to be accordingly switched as the viewed object becomes close or distant. One principle behind is that, as light beams pass the crystalline lens in the eyeball, the ciliary muscle causes the crystalline lens to perform elastic deformation movements to adjust the focal length. In response, the present invention further considers, in a head-mounted multimedia system, although the above conventional technical solutions do assist a visually impaired user to clearly view an image, the crystalline lenses of the eyes of the user usually do not need to perform elastic deformation movements to adjust the focal length once the user is able to clearly view the image. In other words, the crystalline lens at this point is kept at a fixed focal length. However, when reading or watching television for an extended period of time, the crystalline lens is also kept at a fixed focal length over an extended period of time, hence leading to eye fatigue or even eye damage. This problem aggravates when a head-mounted personal multimedia system is used because the viewing distance is closer to that for reading.

In view of the above, the present invention provides a solution, one feature of which being that, the crystalline lens is prevented from being kept at a fixed focal length given that a user is able to clearly view an image. For example, a diopter adjustment unit is disposed between the eyes and the image to provide the eyes with diopter. Through the dynamically adjusted diopter provided, in order to have the eyes of the user clearly see the image, the crystalline lens is induced to perform physiological accommodation movements to adjust its focal length (i.e., the diopter) to thereby alleviate eye fatigue.

In other words, even if a myopic user wears contact lenses and does not need the conventional solution disclosed by the CN205038406 U or CN205103492 U, the user may again encounter the issue of eye fatigue caused by keeping the crystalline lens at a fixed focal length for an extended period of time when the user uses the head-mounted personal multimedia system. Therefore, the user may still enjoy the benefits the present invention provides.

Particularly, in the present invention, the diopter provided by the diopter adjustment unit is correspondingly changed according to a change in a region of interest (ROI) of the user in an image. In other words, the diopter of the eyes also changes with a change in the gaze direction of the user, as if viewing objects in the real world, with the objects located close and distant. For example, when the ROI of the user in the image is a distant scene, the disposed diopter adjustment unit may provide a greater diopter to provide a greater focusing capability, such that the eyes are caused to adjust to a lower diopter, as if the eyes are viewing a distant scene in the real world. In contrast, when the ROI of the user in the image is a near scene (e.g., a portrait), the disposed diopter adjustment unit may provide a lower diopter to provide a smaller focusing capability, such that the eyes are caused to adjust to a greater diopter, as if the eyes are viewing a near scene in the real world.

Further, to allow the eyes of the user to perform elastic deformation movements as when viewing objects in the real world while the user wears a head-mounted personal multimedia system, in another embodiment of the present invention, apart from or in addition to according to the gaze direction of the user or the ROI of the user in the image, the diopter provided by the diopter adjustment unit may be further changed according to luminance information of the image. For example, for a brighter image (e.g., a scene showing the daylight), the disposed diopter adjustment unit may provide a greater diopter to provide a greater focusing capability, such that the eyes are caused to adjust to a lower diopter, as if viewing the daylight in the real world. In contrast, for a dimmer image (e.g., a scene showing the nighttime), the diopter adjustment unit may provide a lower diopter to cause the eyes to adjust to a greater diopter, as if the eyes are viewing the nighttime in the real world.

On the other hand, due to different eye conditions of users, in another embodiment of the present invention, the diopter provided by the diopter adjustment unit is further configured according to user data. It is understandable that, the diopter adjustment unit provides, for example, a user with normal vision and a myopic user, an elderly and an infant, or even a left eye and a right eye of a user, preferably with different diopters, and so the method and magnitude of the adjustment may also be different. Particularly, in one embodiment, to prevent drastic physiological accommodation movements of the crystalline lens, the sensitivity and magnitude of the diopter adjustment unit may be limited. In other word, in this embodiment, the diopter adjustment unit is inclined to dynamic qualitative adjustment instead of quantitative adjustment, based on different individuals.

The present invention provides outstanding effects on public hygiene. For young and teenager users who are not myopic but are prone to myopic conditions, the present invention reduces crystalline lens fatigue and hence the probability of myopic pathogenesis. Further, it should be noted that, although being different from the foregoing disclosures of CN205038406 U and CN205103492 U, the present invention and the above disclosures are not mutually exclusive, and may even be integrated with one another. For example, in one embodiment, in addition to continuously dynamically adjusting the diopter provided to prevent eye fatigue, the diopter adjustment unit may also make up the shortage in the diopter through the diopter adjustment unit when the user cannot clearly see the image or a related scene due to, for example, myopia; that is, an effect similar to wearing correction glasses is achieved—such adjustment is quantitative. Particularly, for a visually impaired (e.g., myopic) user, preventing the crystalline lens from kept at a fixed focal length is even more needed. Therefore, the present invention provides more substantial benefits on this issue as opposed to the prior art.

Also based on the above factor, the present invention is applicable to VR, AR and MR systems. Especially in see-through systems such as AR and MR systems, a user needs to view an image or information that the system provides at a close distance as well as an outside scene at a far distance. With the present invention, for example, when the user views the image the system provides at a close distance, the diopter adjustment unit may dynamically adjust the diopter to prevent eye fatigue; when the user views an outside scene at a far distance, the diopter adjustment unit may make up the shortage in the diopter to allow the user to clearly see the scene at a far distance.

In addition, the present invention further considers the issue that a spectacle magnification in a head-mounted personal multimedia system changes with the change in the focusing capability caused from adjusting the diopter. In one embodiment, a viewable area of the image in the head-mounted personal multimedia system is correspondingly adjusted in response to the diopter that the diopter adjustment unit provides to counteract the issue of the change in the spectacle magnification. In another embodiment, a distance between a display surface of the image in the head-mounted personal multimedia system and the eyes of the user is correspondingly adjusted in response to the diopter that the diopter adjustment unit provides to counteract the issue of the change in the spectacle magnification.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

The following description, the appended claims, and the embodiments of the present invention further illustrate the features and advantages of the present invention.

DETAILED DESCRIPTION OF THE EMBODIMENTS

Figure 1:
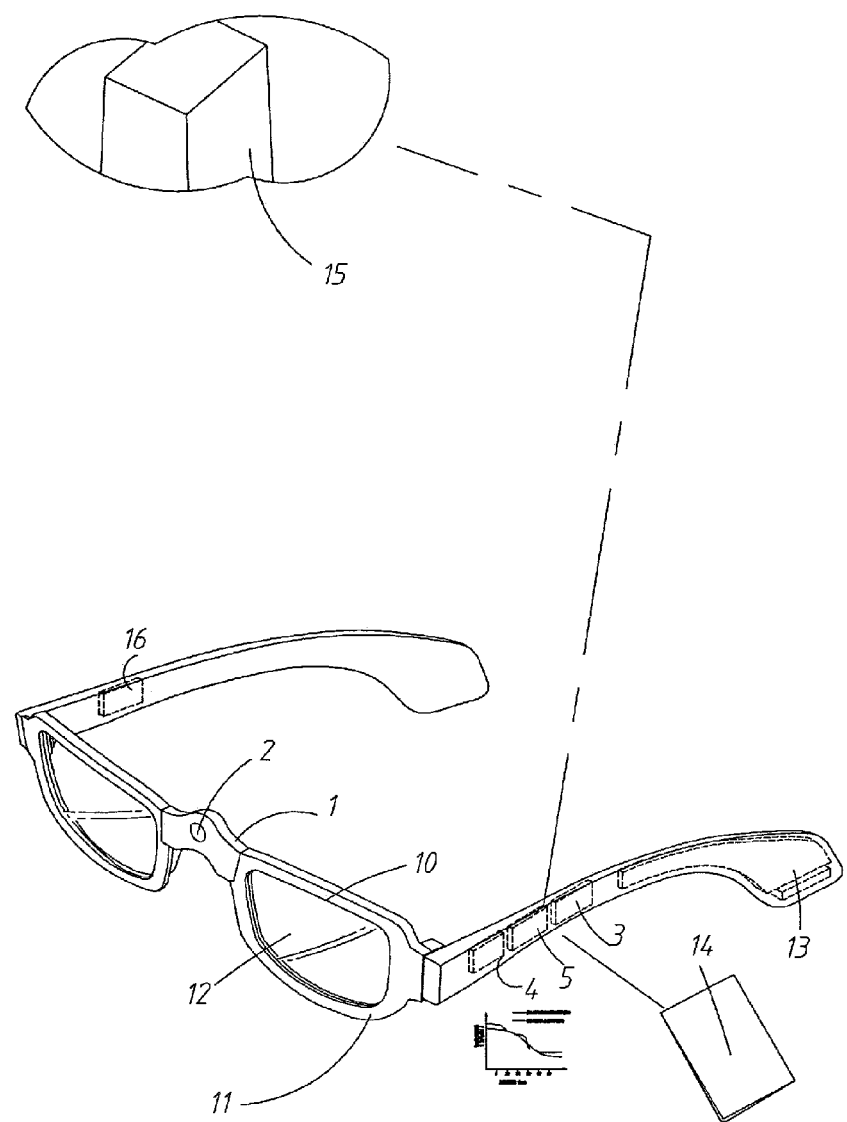
FIG. 1 is showing a perspective schematic view of an embodiment of the invention.
Figure 2:
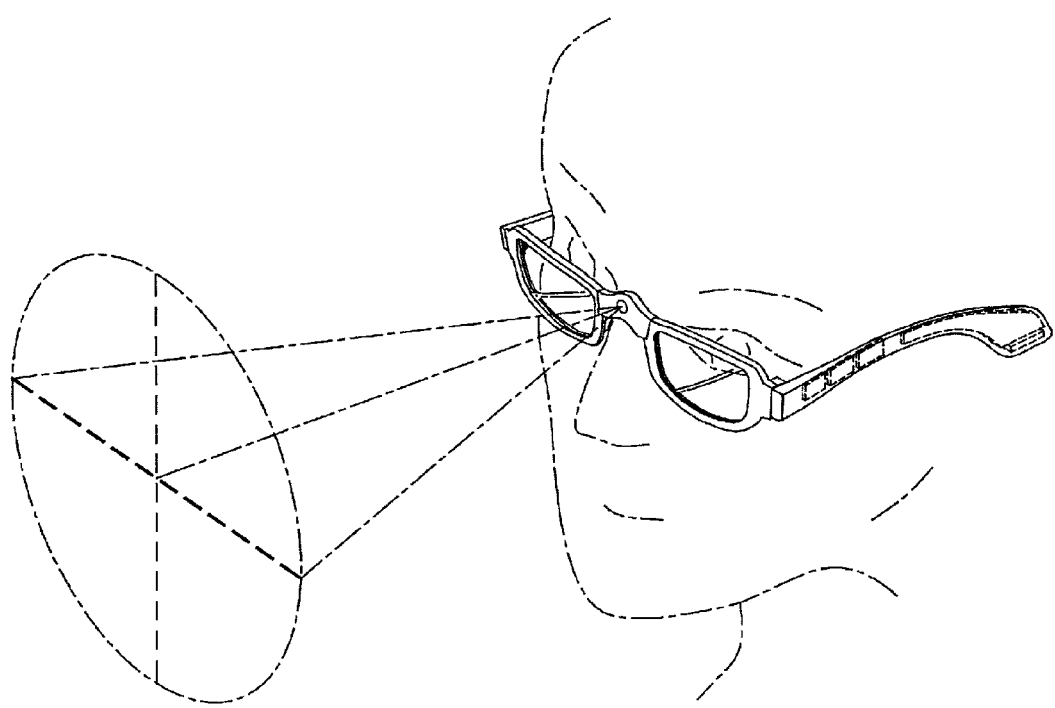
FIG. 2 is showing a perspective view of an embodiment of the invention.
Figure 3:
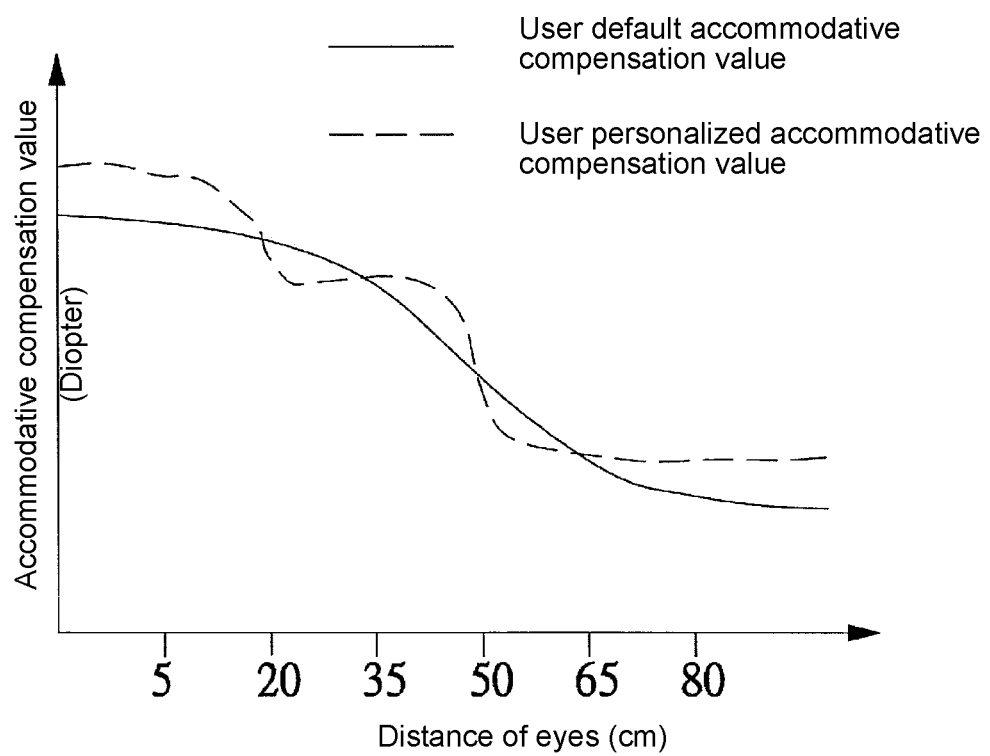
FIG. 3 is showing a default and modified visual accommodative compensation value curve diagram view of an embodiment of the invention.
Figure 4:
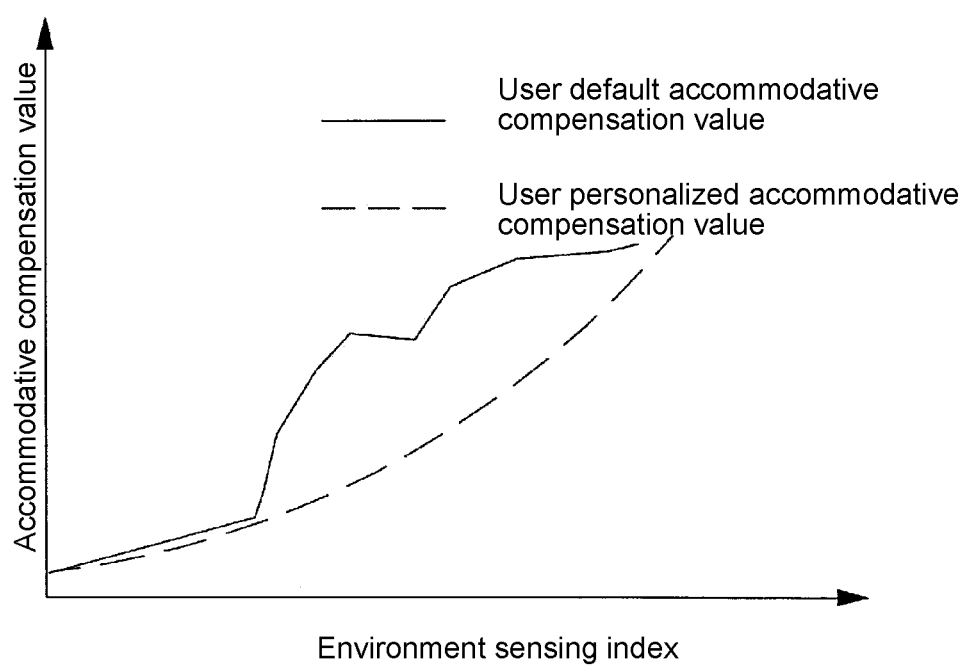
FIG. 4 is showing a default and modified visual accommodative compensation value curve diagram view of an embodiment of the invention.
Figure 5:
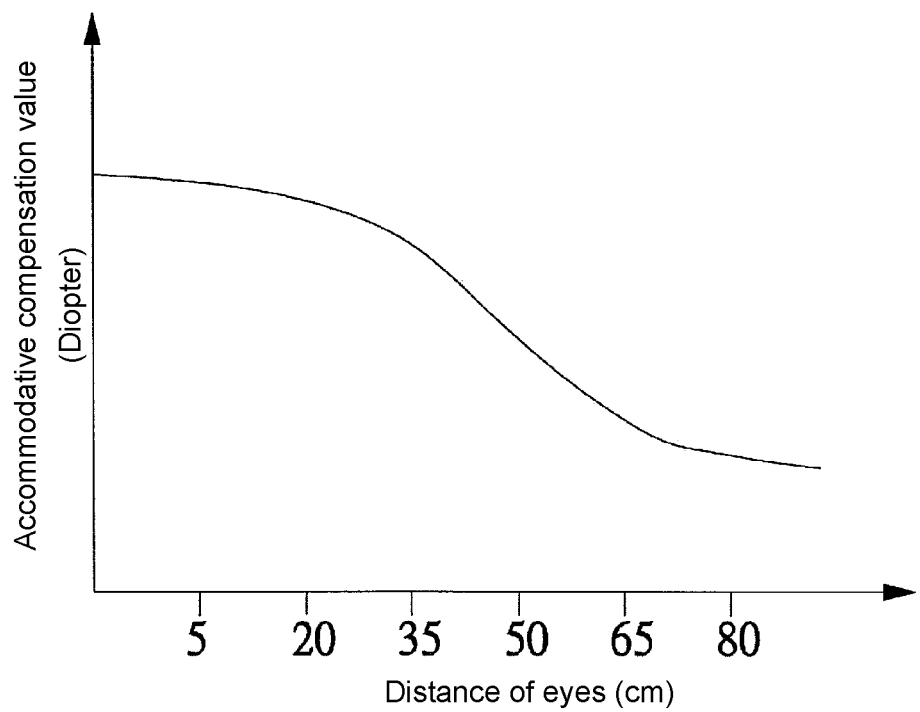
FIG. 5 is showing a curve's relationship adjustment amount the accommodative compensation value and object distance diagram view of an embodiment of the invention.
Figure 6:
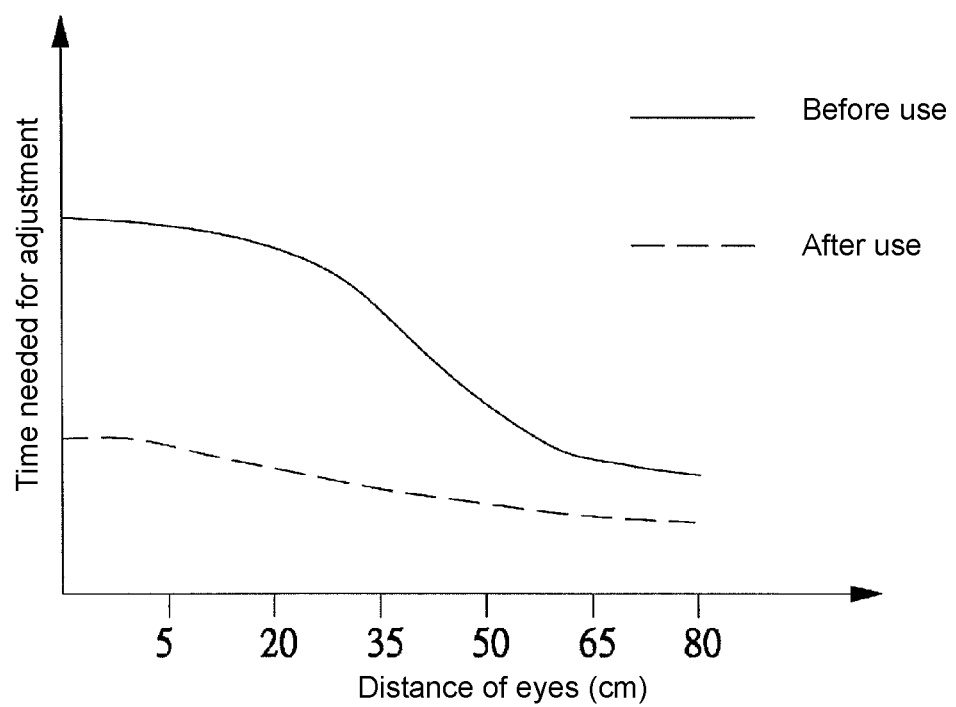
FIG. 6 is showing a curve's relationship adjustment time of the accommodative compensation value and object distance diagram view of an embodiment of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer system/device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 13b, computer systems/devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

<Auto-Focus Glasses with Visual Accommodative Compensation System>

Referring to FIGS. 1 to 8, an exemplary auto-focus glasses with visual accommodative compensation system, is to provide a better visual experience for everyone in needs under various viewing scenario. The environmental sensor is constantly detecting and gathering information of viewing objects' distance, light intensity and surrounding environment. All these data are sent to processor modular for analyzing and comparing with default visual accommodative compensation values or personal settings from autodidactic modular, and regulator modular automatically adjusts the focus accordingly. If current adjustment dose not match current user's request, the user can activate the learning mode to amend until optimum setting is satisfied, and the new data is added to the system. In addition, the system will create a custom assisted-refractive-power values as the accommodative compensation values (ACVs) in physiological visual accommodative compensation, which is going to increase the focusing adjustment speed in future use. Therefore, the user will have a faster, accurate and comfortable assisted visual experience, and it can reduce the requirement of accommodative movement from the natural crystalline lens. Moreover, this embodiment can be used not only on the myopia prevention, but also for visual training in strabismus and amblyopia. Also, patients, who have undergone the cataract removal and intraocular lens implantation, can be benefited as well.

To meet the object above, the exemplary embodiment is constructed into a glass frame, which has a lens modular and a regulator modular embed on the each side of the glasses frame. Inside the glasses frame, there are power connector modular, that connecting with regulator modular for focus adjustment, and environmental sensor modular, which obtain the brightness of the light source and the distance between the target object and glasses. All data are sent to processor modular for analyzing. The processor modular calculates various optimum real-time personal focal length as ACVs, accommodative compensation values, and adjustment feedback values send to the regulator modular for focal adjustment. The default ACVs data, which stored in the memory modular for processor modular to verify during analyzing, have been created based on age, object distance, environmental brightness and refractive power. Hence, from the time of use, the system in the autodidactic modular, which creates an optimum customized ACVs through recording and analyzing, can provide individual user the most comfortable focal length in varies environmental scenarios. The processor modular and the memory modular, which could be embedded in the glasses frame, can interact with the cloud device or personal portable device thought the wireless connection embedded in the glasses frame.

In FIG. 1, there are a glasses frame 1 and a pair of lens space 10. Inside each of the lens space 10, there are a regulator modular 11 and a lens modular 12. Lens modular 12 contains with a custom-made lens to correct the basic refractive error such as myopia, hyperopia, astigmatism and strabismus. Since there are many methods of lens construction, lens modular 12 could be, but not limited to, made by referring to the U.S. Pat. No. 7,934,831, which is used here as applicability description.

This embodiment further contains an electrical connection between power source 13 and regulator modular 11 in the glasses frame 1; the regulator modular 11 holds the focal adjustment for lens modular 12. The power source 13 can be charged up with mini-USB or other forms of wireless or wire connector. Environmental sensor 2, at glasses frame 1, detects and sends target object distance and surrounding brightness values to processor modular 3 for analyzing. Processor modular 3 calculates focal length from ACC 4, and sends to regulator modular 11 for the movement position of lens modular 12, in order to obtain the optimum visual clarity.

Figure 7:
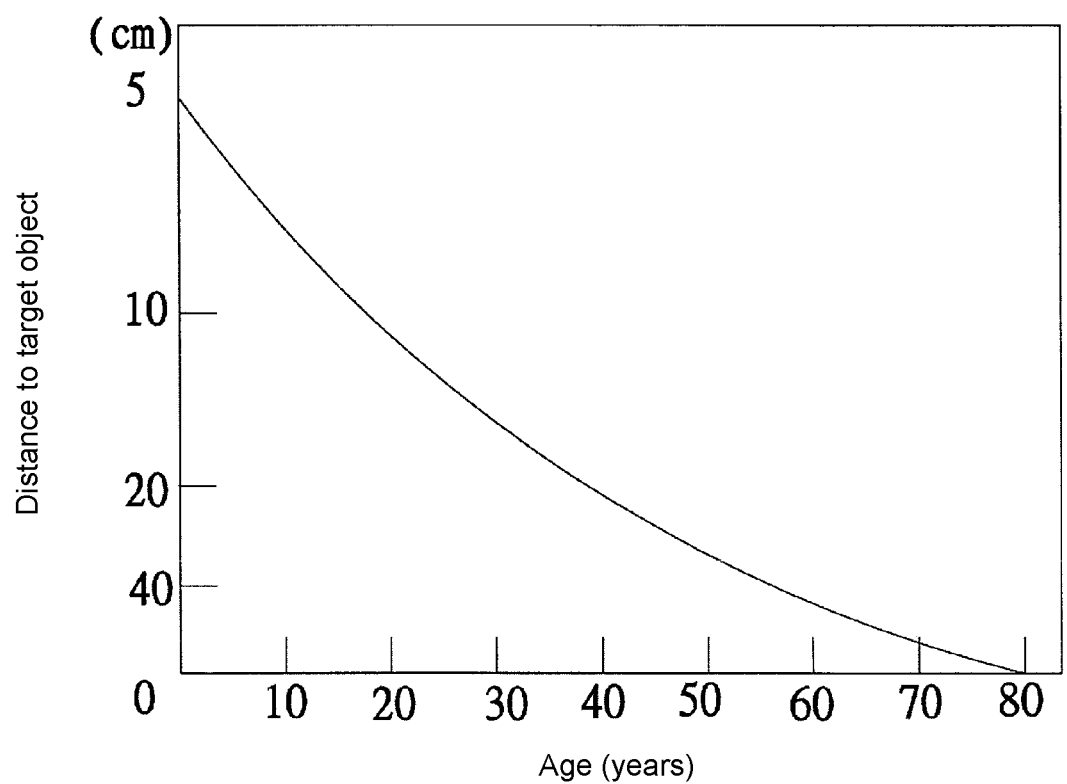
FIG. 7 is showing a default curve in relate focal length and age diagram view of an embodiment of the invention.

The default ACC 4 has been created to match with age and eye examination, as seen in FIG. 7, and stored in memory modular 5 for processor modular 3 to verify in the course. Furthermore, the default ACC 4 was set according to different age group, gender, race and ophthalmological parameters. User data is modified with default ACC, including environmental brightness, object distance and refractive power from processor module's 3 algorithm; these data will be uploaded to the cloud data center for big data analysis. As the result, the system can be more accurate as more users joining to the cloud data. The cloud data is updated by wireless connections. In addition, another major point of this embodiment is the processor modular 3 can predict the usage scenario and to pre-calculate the adjustment values in real-time, according to various living scenario, environmental brightness and personal health.

In the glasses frame 1, processor modular 3 and memory modular 5 can link with wireless device 5 or personal portable device 4, such as mobile phone, and interact with cloud database. Moreover, other portable or wearable device, which is able to detect image or brightness of the user's surrounding, can be a sharing extension, providing various reference information for lens modular 12 movement. By doing this, it can be not only saving energy, but also reducing the calculation payload to the processor.

The autodidactic modular 16, inside the glasses frame 1, is connected to processor modular 3 as well. The autodidactic modular 16 can activate processor module's 3 learning mode, which gathers the current object distance, environmental brightness and modified focal value for the user to memory modular 5, by tapping on the frame. In the learning mode, there are predict and manual mode can be selected from the numbers of tapping on the fame. After few seconds of operation, the learning mode will automatically turn off to save power.

The environmental sensor 2 can detect surroundings, and the system will synchronal adjust the focal length appropriately. Furthermore, if a presbyopia user requires 5.0 D focal adjustment under certain brightness and distance, the processor modular 3 will activate regulator modular 11 to drive the focal length changes of lens modular 12. However, if the user's vision dose not satisfied with the default setting, the user can activate the learning mode by tapping on the glasses frame to make a correction. During the correction process, the regulator modular 11 will stop the current adjustment, and the user can move the object or head position to obtain the best subjective viewing distance. Also, the environmental sensor 2 will detect the distance differences and transmit data to processor modular 3 for customizing ACVs from default ACVs. Then the system adjusts lens modular 12 to decrease or increase the focal length and to raise or reduce the refractive power from the current feedback. Hence, the processor modular 3 will record new focal length and current brightness to that specific object distance to memory modular 5 and turn off the learning mode. In future use, when user faces similar condition, the system will automatically recognize and adjust to user's preferable personal ACVs settings.

For example, in learning mode, the system will detect the changing distance between object and glasses. At certain distance, 27 cm, and brightness, 275 Lux (illumination units: square meters of area ratio of luminous flux $lm/m^2$), ACV system provided +2.75 D focal adjustment for the presbyopia user, but the user did not like with the default settings. The user can activate the learning mode and move his/her head or the object closer for certain distance, i.e. 2 cm. At user's best visual clarity, for instance movement pause for few seconds, the environmental sensor 2 will detect the difference and showing user's original status of tendency toward hyperopia. The processor modular 3 will keep the new record of +2.75 D focal adjustment with new distance (27 cm−2 cm=25 cm) at 275 Lux for future use, as [25 cm, +2.75 D, 275 lux]. Moreover, the processor modular 3 will calculate and reduce the focus length to increase the positive refractive power, such as reducing 0.25 D, to +2.50 D under the current corresponding distance, 27 cm, and brightness, 275 Lux. Hence, next time, when specific distance, 27 cm, and brightness, 275 Lux, occur, ACV system will provide +2.50 D focal adjustment instead of +2.75 for user, as [27 cm, +2.50 D, 275 lux]. Therefore, the ACV system will learn at least two new coordinates and adjustment values through one process, each time. Furthermore, the increase in brightness can cause pupil contraction, and the visual depth of field and focal adjustment sensitivity will increase. Therefore, in the same distance of 27 cm and the brightness of 650 lux, the refractive power will be reduced to +2.25 D, as [27 cm, +2.25 D, 650 lux].

This embodiment gradually gains the accurate accommodative compensation values 4 feedback from everyday use.

Even without visual ACC, user is able to directly adjust lens modular 12 through autodidactic modular 16 for the best visual acuity by sliding forward touching on the glasses frame 1; the lens modular 12 will reduce the focal length to increase the positive reflective power, and vice versa. After the best visual acuity is set, by tapping on the glasses frame 1 again, processor modular 3 will save the setting to memory modular 5 and turn off the learning mode. The memory modular 5 will record the current brightness, distance and focal length values for automatic feedback on the next similar scenario. Above description is for explanatory purpose only, but not limit to specific method. As the result, this embodiment has autodidactic ability. The relation for before and after adjustment is presented as FIG. 3 and FIG. 4.

The environmental sensor 2 detects object distance, light intensity and surrounding information. All these information are sent to processor modular 3 for analyzing and comparing with default visual accommodative compensation data 4 or personal settings from the autodidactic modular 16, and regulator modular 11 automatically adjusts the focus accordingly. If current adjustment dose not match current user's need, the user can activate the learning mode to amend until optimum setting is satisfied, and the new data is added to the system in memory modular 5. In addition, the system will create a costumed assisted-refractive-power values in physiological visual accommodative compensation, which is going to significantly increase the focusing adjustment speed in future use. Moreover, the learning mode can dynamically adjust focal value, and it can provide better visual reaction for elder or user, who has fatigue eye or congenital focal adjustment difficulty.

Accommodative compensation values 4 can be in table or graphic form. The database of visual ACV was built on several factors in various living condition and age. Under different viewing distance, environmental brightness and user's habit, the focal adjustment change can be as accurate as ±0.10 diopter unit precisely. The big data of visual ACVs contains many user groups' characteristic data. Visual ACC 4 comes from the preset values of the database. Each characteristic data can be pre-stored in memory modular 5 or downloaded from the cloud server 5, corresponding to optometry parameters, eyeball structure measure or age. The processor modular 3 will analysis incoming sound, light or electromagnetic waves to decide focal adjustment corresponding to the environmental brightness and viewing distance; this process can release the natural crystalline lens' burden while accommodation, as FIG. 5 and FIG. 6.

The accommodative amplitude is the change range of reflective power in visual function. For example, 5.0 D means the crystalline lens lose the adjustment ability at certain range permanently or in a period of time, due to fatigue, aging, or various reasons. This causes hyperopia to have difficulty to see closer object. Therefore, the regulator modular 11, a motor or other modular in glasses frame 1, can work as coordinator slowly or instantly adjust as processor modular 3 required. Processor modular 3 can embed in the glasses frame 1 or as a software application in any portable or wearable device, such as smartphone or watch, with wireless or Bluetooth connection to command the regulator modular 11 for adjusting the lens modular 12. The lens modular, in this embodiment, can be as focal adjustable lens or electronic accommodative intraocular lens.

Figure 8:
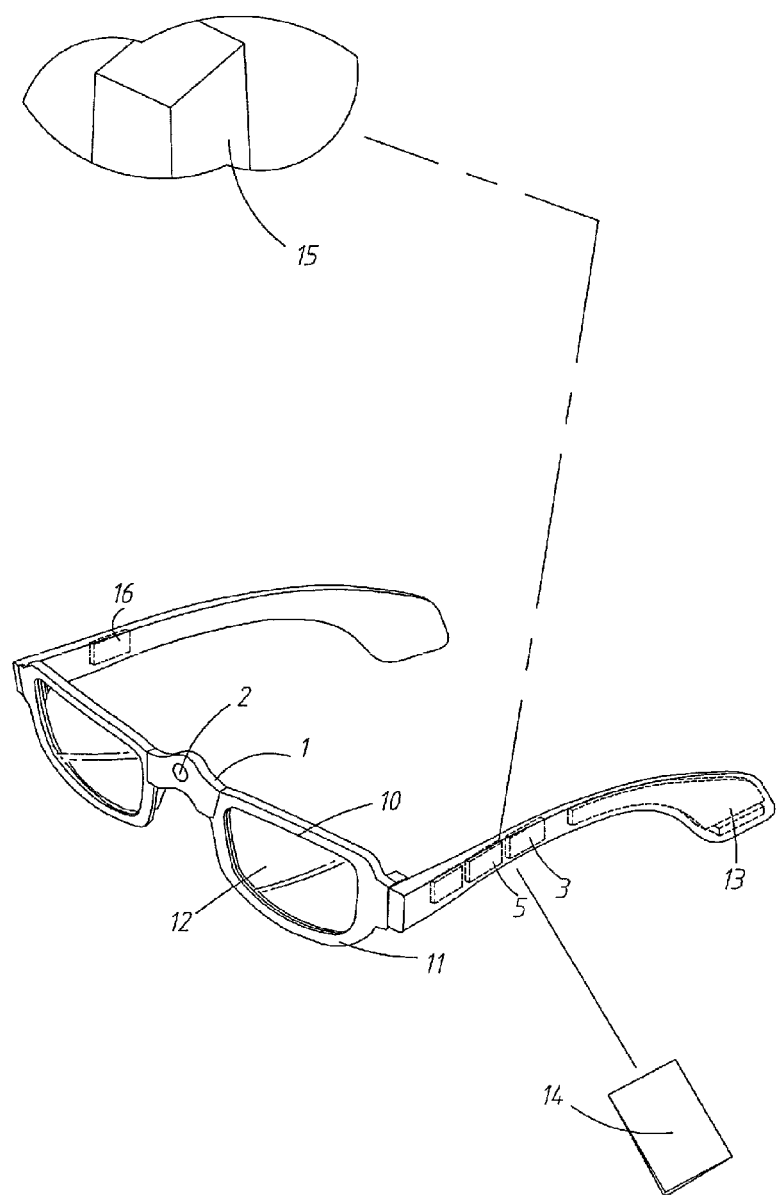
FIG. 8 is showing another perspective schematic view of an embodiment of the invention.

As FIG. 8, this embodiment can work from modifying the default visual ACC 4 to the customized visual ACC 4, under autodidactic mode. The user is like getting an additional bionic crystalline lens, which assisting focal adjustment for visual experience. Therefore, this release the workload of natural crystalline lens accommodative movement in order to release eye fatigue. This embodiment is different from U.S. Pat. Nos. 8,474,976 and 8,628,193, because this embodiment has the ability to record and modify the refractive power requirement from focal adjustment. As the result, this embodiment is based on providing the realistic visual assisting functions to its user.

Whether myopia, hyperopia or astigmatism, after the basic diopter correction, the eyes still require accommodative ability for changing focus between near and far visual distances. 2. The following table is the accommodative demands under various distances and illumination. This embodiment is an automatic focusing eyewear for people, who lost the accommodative ability in sight. It can immediately satisfy the adjustment needs between near and far viewing distances. In order to fulfill the needs of the focal length switching under various visual distance, the table below shows at least +0.00 D~+7.25 D accommodative amplitude for normal eye usage. Nevertheless, taking into account the individual accommodative demand, this embodiment provides a range of +0.00 D~+9.00 D.

The table below is for accommodative demand under various visual distances

| | The Distance area and Environment brightness with diopters | | | | | | | | | | | |
|---|---|---|---|---|---|---|---|---|---|---|---|---|
| | EB (lux) | | | | | | | | | | | |
| Dis (cm; m) | 50~75 (65) | 75~100 (80) | 100~150 (120) | 150~200 (180) | 200~300 (275) | 400~500 (485) | 500~600 (550) | 600~750 (700) | 750~1000 (900) | 1000~1500 (1200) | 1500~5000 (3500) | 5000~100000 (30000) |
| 10 m~∞ | +0.000 D | +0.000 D | +0.000 D | +0.000 D | +0.000 D | +0.000 D | +0.000 D | +0.000 D | +0.000 D | +0.000 D | +0.000 D | +0.000 D |
| 0.9 m~ | +0.125 | +0.125 | +0.125 | +0.125 | +0.025 | +0.025 | +0.000 | +0.000 | +0.000 | +0.000 | +0.000 | +0.000 |

-continued

The Distance area and Environment brightness with diopters

| Dis (cm; m) | EB (lux) | | | | | | | | | | | |
|---|---|---|---|---|---|---|---|---|---|---|---|---|
| | 50~75 (65) | 75~100 (80) | 100~150 (120) | 150~200 (180) | 200~300 (275) | 400~500 (485) | 500~600 (550) | 600~750 (700) | 750~1000 (900) | 1000~1500 (1200) | 1500~5000 (3500) | 5000~100000 (30000) |
| 10 m | D | D | D | D | D | D | D | D | D | D | D | D |
| 80 cm~90 cm | +0.500 D | +0.500 D | +0.250 D | +0.250 D | +0.250 D | +0.125 D | +0.000 D | +0.000 D | +0.000 D | +0.000 D | +0.000 D | +0.000 D |
| 70 cm~80 cm | +1.000 D | +1.000 D | +0.875 D | +0.850 D | +0.750 D | +0.625 D | +0.500 D | +0.500 D | +0.375 D | +0.375 D | +0.250 D | +0.125 D |
| 43 cm~70 cm | +1.500 D | +1.500 D | +1.375 D | +1.300 D | +1.250 D | +1.125 D | +1.000 D | +0.875 D | +0.750 D | +0.625 D | +0.500 D | +0.475 D |
| 33 cm~43 cm | +1.875 D | +1.750 D | +1.750 D | +1.750 D | +1.750 D | +1.625 D | +1.625 D | +1.625 D | +1.500 D | +1.375 D | +1.250 D | +1.000 D |
| 30 cm~33 cm | +2.250 D | +2.125 D | +2.000 D | +2.000 D | +2.000 D | +2.000 D | +1.875 D | +1.875 D | +1.750 D | +1.625 D | +1.550 D | +1.500 D |
| 27 cm~30 cm | +2.750 D | +2.875 D | +2.500 D | +2.450 D | +2.375 D | +2.375 D | +2.250 D | +2.250 D | +2.125 D | +2.125 D | +2.125 D | +2.000 D |
| 25 cm~27 cm | +3.8750 D | +3.750 D | +3.750 D | +3.750 D | +3.750 D | +3.625 D | +3.500 D | +3.500 D | +3.250 D | +3.250 D | +3.125 D | +3.000 D |
| 20 cm~25 cm | +4.250 D | +4.250 D | +4.125 D | +4.125 D | +4.125 D | +4.000 D | +4.000 D | +3.875 D | +3.875 D | +3.650 D | +3.500 D | +3.500 D |
| 16 cm~20 cm | +5.625 D | +5.625 D | +5.375 D | +5.375 D | +5.375 D | +5.125 D | +5.125 D | +5.125 D | +5.000 D | +5.000 D | +5.000 D | +5.000 D |
| 13 cm~16 cm | +6.250 D | +6.250 D | +6.125 D | +6.125 D | +6.125 D | +5.750 D | +5.500 D | +5.500 D | +5.375 D | +5.375 D | +5.250 D | +5.250 D |
| 5 cm~13 cm | +7.250 D | +7.250 D | +7.000 D | +7.000 D | +7.000 D | +6.500 D | +6.500 D | +6.250 D | +6.125 D | +6.125 D | +6.125 D | +6.125 D |

EB = Environment brightness (unit = lux);
Dis = Distance area(unit = cm; m);
D = Diopter Assuming under normal condition, natural eye requires 3 seconds to acquire +4.25 D refractive power change for switching viewing object from 10 m to 25 cm. It is fast. However, at the same viewing condition from 10 m to 25 cm, presbyopic eye, only remaining +2.50 D accommodative amplitude, which unable to adapt as accommodative demand, needs 1 minute or more to adjust, due to decline in adjustment facility. Even with +1.75 D ordinary reading glasses, it does not change the fact of slow adjustment, still taking 1 minute or more to focus. On one hand, considering quality of life, presbyopic glasses has lose its meaning. On the other hand, this auto-focusing system embodiment can provide user with +4.25 D refractive power change in 3 seconds. Just like healthy eye, it can assist user rapidly switching focus accordingly in various visual distances. Because of diverse needs in individuals, this embodiment can self-learning personal adjustment data from human-machine interactions, amending preset values and recording personal visual baseline. Let each distance and environmental brightness have the best corrected visual acuity.

To sum up, this exemplary auto-focal visual assisting system is provided through changing the focal length from focal adjustable lens modular and regulator modular. The ACVs data adjustment, which contains user's best subjective visual experience under various visual scenario, is relied on the autodidactic module's learning functions. This is different from the previous patents or current commercial manual focus adjustable glasses.

<Head-Mounted Personal Multimedia System>
<System Structure>

Figure 9:
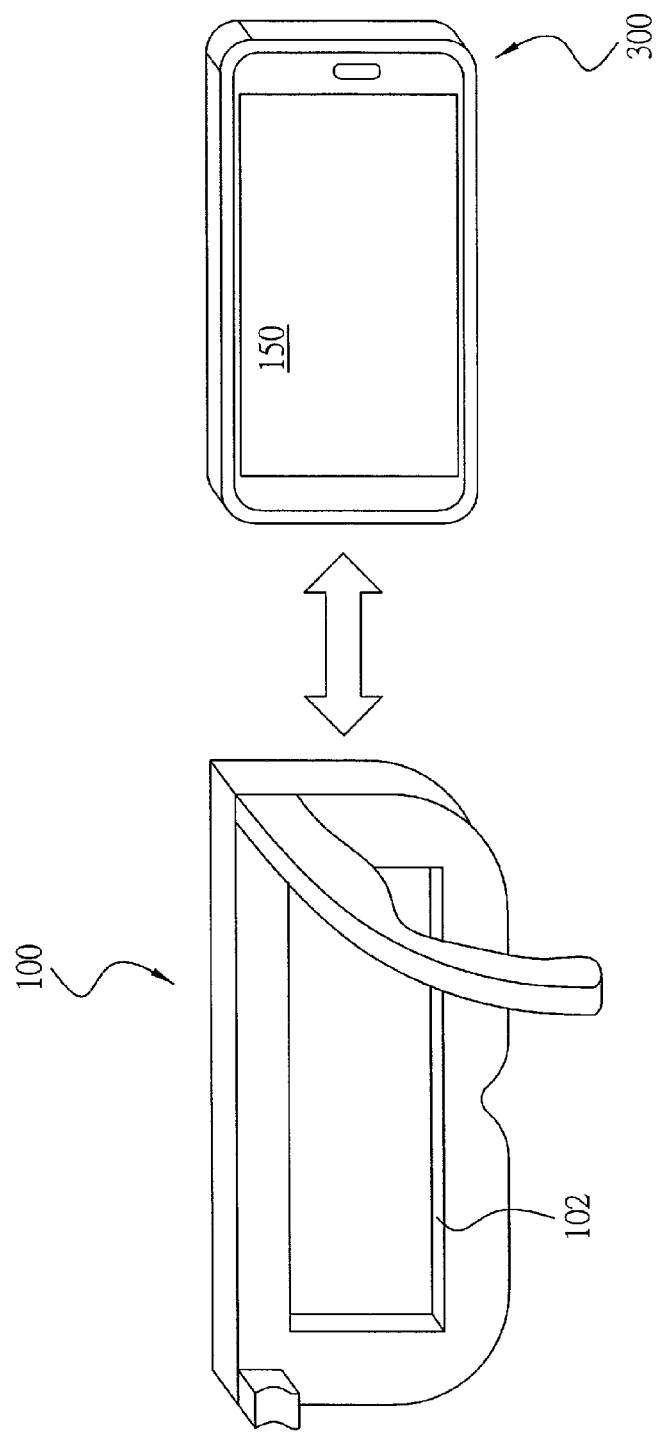
FIG. 9 is showing a head-mounted personal multimedia system according to an embodiment of the present invention.

FIG. 9 shows a head-mounted personal multimedia system 100 according to an embodiment of the present invention, which may appear similar to a pair of glasses, for example, with reference to Oculus Rift, HTC Vive, and Google Cardboard. Further, implementation details not directly associated with the present invention may be referred from disclosures of the CN205038406 U, CN 205103492 U, US20100079356A1, US20150253574A1 and U.S. Pat. No. 9,122,321B2, and shall be omitted herein. It should be noted that, the head-mounted personal multimedia system may be a packaged product similar to Oculus Rift or HTC Vive, may be implemented similar to Google Cardboard, or may be a modular product disclosed in the US20100079356A1 and US20150253574A1.

A head-mounted personal multimedia system 100 shown in the embodiment in FIG. 9 is a modular product. The head-mounted personal multimedia system 100 includes a frame 102 for accommodating or disposing various required modular units. As shown, in this embodiment, the frame 102 may accommodate, for example but not limited to, a mobile phone 300 having a display screen 150, e.g., an Apple iPhone. When the mobile phone 300 is accommodated in the frame 102, the mobile phone 300 may serve as a multimedia player of the head-mounted personal multimedia system 100 to display images or play videos, and the display screen 150 may serve as a display unit of the head-mounted personal multimedia system 100 to display images to a user.

In another embodiment not shown in the drawings, the head-mounted personal multimedia system 100 may include exclusive player and display unit instead of sharing a player and a display unit with other devices (e.g., the mobile phone 300). The display unit exclusive to the head-mounted personal multimedia system 100 may be implemented by an LCD panel, an LED panel or a projection display. Details of a head-mounted personal multimedia system adopting a projection display may be referred from the U.S. Pat. No. 8,487,838 B2, in which a display surface of a display image is translucent. In addition to viewing a projected image or projected information, a user may also see an outside scene through the display surface. That is, it should be understood that, the head-mounted personal multimedia system 100 may be used in VR, AR or MR applications, and is not limited to a specific application field. It is also understood that, when a user wears the head-mounted personal multimedia system 100, regardless of the type of above display units adopted, a physical distance between a display surface provided and the eyes is substantially constant. The constant physical distance between the display surface provided and the eyes means that, without considering deviation caused by drastic vibrations of a head of the user, could be understood in a way similar to a substantially constant physical distance between conventional glasses and eyes. Therefore, in the head-mounted personal multimedia system 100, if without the solution provided by the present invention, the focal lengths of the crystalline lenses of the user are kept constant when the user views the image provided by the display surface, which causes eye fatigue over an extended period of time.

Further, the frame 102 may include a conductive wire (not shown) connected to an input/output (I/O) port of the mobile phone 300 to allow other modular units to signally communicate with the mobile phone 300. In another embodiment, the signal communication between other modular units on the frame and the mobile phone 300 may also be performed directly or indirectly through wireless signals (e.g., Bluetooth).

Figure 10:
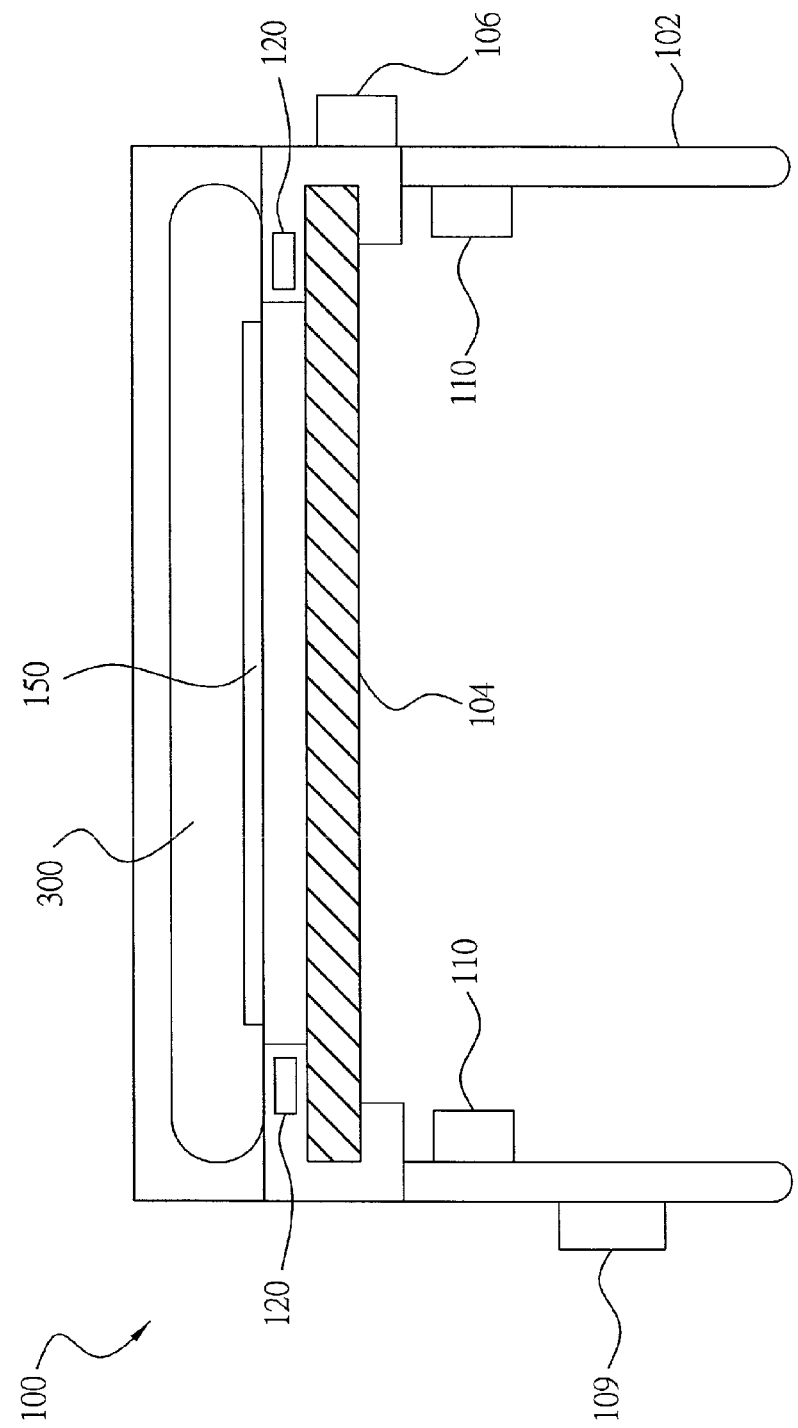
FIG. 10 is showing a head-mounted personal multimedia system according to an embodiment of the present invention.

As shown in FIG. 10, the head-mounted personal multimedia system 100 includes a gaze detection unit 110 disposed on the frame 102. In one embodiment, implementation details of the gaze detection unit 110 may be referred from those disclosed in U.S. Pat. No. 8,487,838 B2 or U.S. Pat. No. 6,456,262B1, but are not limited thereto. These details are omitted herein. In another embodiment, the gaze detection unit 110 may be implemented on the mobile phone 300, i.e., shared with the mobile phone 300. Associated details may be referred from AMAZON FIRE PHONE by AMAZON.

In addition to the gaze detection unit 110, the frame 102 may selectively be disposed with a luminance detection unit 120. The luminance detection unit 120 may be implemented as a photosensitive unit in any quantity, e.g., a CMOS image detection unit, a photoelectric diode unit or a CCD unit, and is not particularly limited by the present invention. It should be noted that, in the prior art, a head-mounted personal multimedia system further also includes a luminance detection unit that detects only the luminance in the environment. However, the luminance detection unit 120 in the embodiment of the present invention is for detecting the luminance of a display surface of a display unit (e.g., the display screen 150) that the user views as the luminance that the eyes of the user senses. Assuming that a display surface of an image is translucent, e.g., in an AR or MR application scenario, the luminance of the display surface may further include luminance contributed by external ambient light beams through the display surface in addition to the luminance of the projected image. Further, according to different embodiments, the luminance detection unit 120 may adopt different light metering modes for the display surface, and switch between the light metering modes based on requirements or user preferences. Associated details may be referred from light metering modes of a camera, e.g., dividing a display surface into multiple small matrix metering regions, or performing spot metering for specific areas; the present invention is not limited to the above examples. Preferably, the light metering mode adopted by the luminance detection unit 120 is capable of reflecting the luminance that the eyes sense. Thus, parts in the display surface that are closer to the eyes may be focused on and be given greater weightings, or light metering is performed only on these parts.

Particularly, the head-mounted personal multimedia system 100 includes on the frame 102 a diopter adjustment unit 104, which is located between the display surface of the display unit (e.g., the display screen 150) and the eyes of the user. The diopter adjustment unit 104 is configurable to provide different diopters while the user views an image, and may be dynamically switched among different diopters. In one embodiment, implementation details of the diopter adjustment unit 104 may be referred from US2015235439A1 disclosing details of a high-frequency zoom lens unit, which is implemented as a membrane deformable mirror and a corresponding driving device. The present invention is not limited thereto, and associated details shall be omitted herein.

The head-mounted personal multimedia system 100 further includes a control unit 106 signally connected to and controlling other function units in the head-mounted personal system 100. The control unit 106 in general includes a microprocessor and a memory (not shown), and controls operations of the diopter adjustment unit 104 according to firmware or loaded programs and parameters. Implementation details of the control unit 106 may be referred from a processing module and data module in the US2015235439A1, and are not limited to being implemented at a local end or a remote end.

It should be noted that, current smart phones are equipped with extremely powerful processing capabilities and data storage capabilities. Thus, in one embodiment, taking the mobile 300 in FIG. 9 for example, its processing resources and data storage resources are sufficient for realizing the control unit 106. In other words, the mobile phone 300 may execute related Apps to control the operations of the head-mounted personal multimedia system 100. Therefore, the head-mounted personal multimedia system 100 is capable of implementing the control unit 106 without needing additional processor and memory. Further, functions of the control unit 106 are not limited to controlling only the operations of the diopter adjustment unit 104.

Figure 11A:
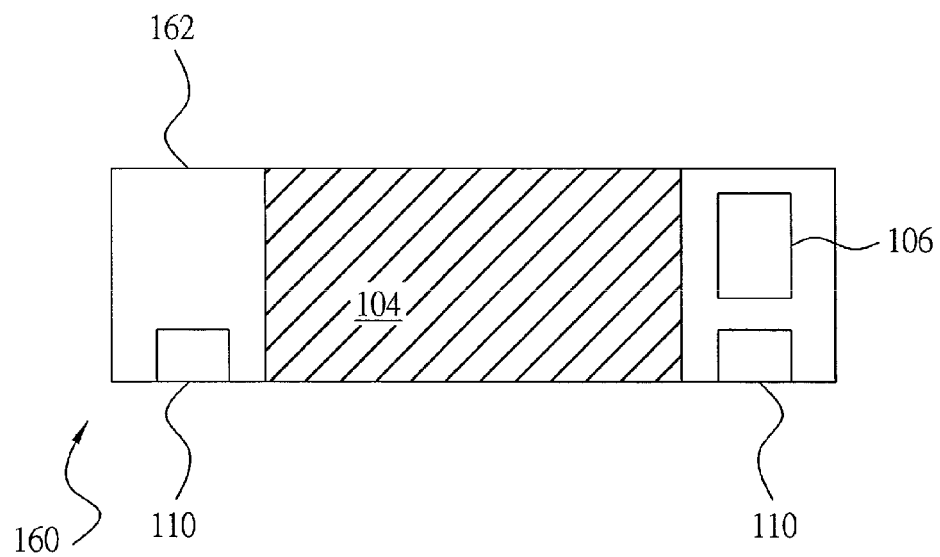
FIGS. 11a and 11b are showing a visual assistance device according to an embodiment of the present invention.
Figure 11B:
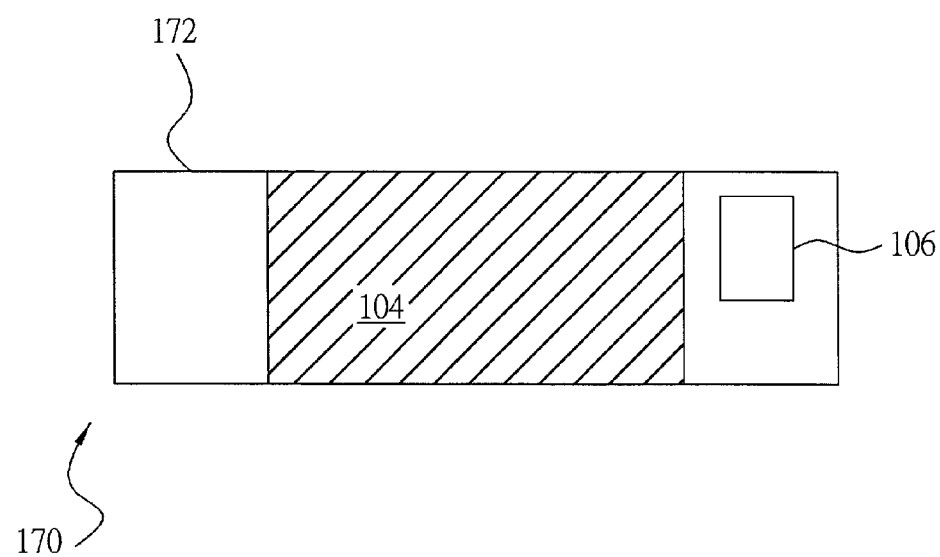

In a modular embodiment, the above function units may all be individually detachably disposed on the frame 102. In another embodiment, as shown in FIG. 11*a*, the gaze detection unit 110, the diopter adjustment unit 104 and the control unit 106 are pre-assembled into a visual assistance device 160, which includes a storage housing 162 in form of a cartridge that can be inserted onto or removed from the frame 102 by the user as desired, as shown in FIG. 10. That is, the mobile phone 300 in FIG. 9 may be insertingly disposed on the frame 102 and be later removed as desired. In another embodiment, only the diopter adjustment unit 104 and the control unit 106 are pre-assembled into a visual assistance device 170, which similarly includes a storage housing 172 similar to a cartridge, as shown in FIG. 11*b*. Thus, the visual assistance device 170 may be further assembled onto the frame 102 or removed from the frame 102 by the user. It should be understood that, the visual assistance device 160 or the visual assistance device 170 does not necessarily include a thin-type storage housing in form of a cartridge, and the present invention may include other shape designs and implementation methods in addition to the above. However, a position for installing the visual assistance device 160 or the visual assistance device 170 needs to locate the diopter adjustment unit 104 between the image and the eyes of the user to allow the diopter adjustment unit 104 to fully exercise its effect.

With the above approach, depending on the needs of the user, instead of being restricted to specific applications, the visual assistance device 160 or the visual assistance device 170 is applicable to current head-mounted personal multimedia systems, such as Google Cardboard, or head-mounted personal multimedia systems disclosed in the US20100079356A1 and US20150253574A1, or even simultaneously suitable for other optical visual devices, such as digital binoculars or microscopes. That is to say, the visual assistance device 160 or the visual assistance device 170 may serve as an external device that can be added or removed by the user.

Figure 12:
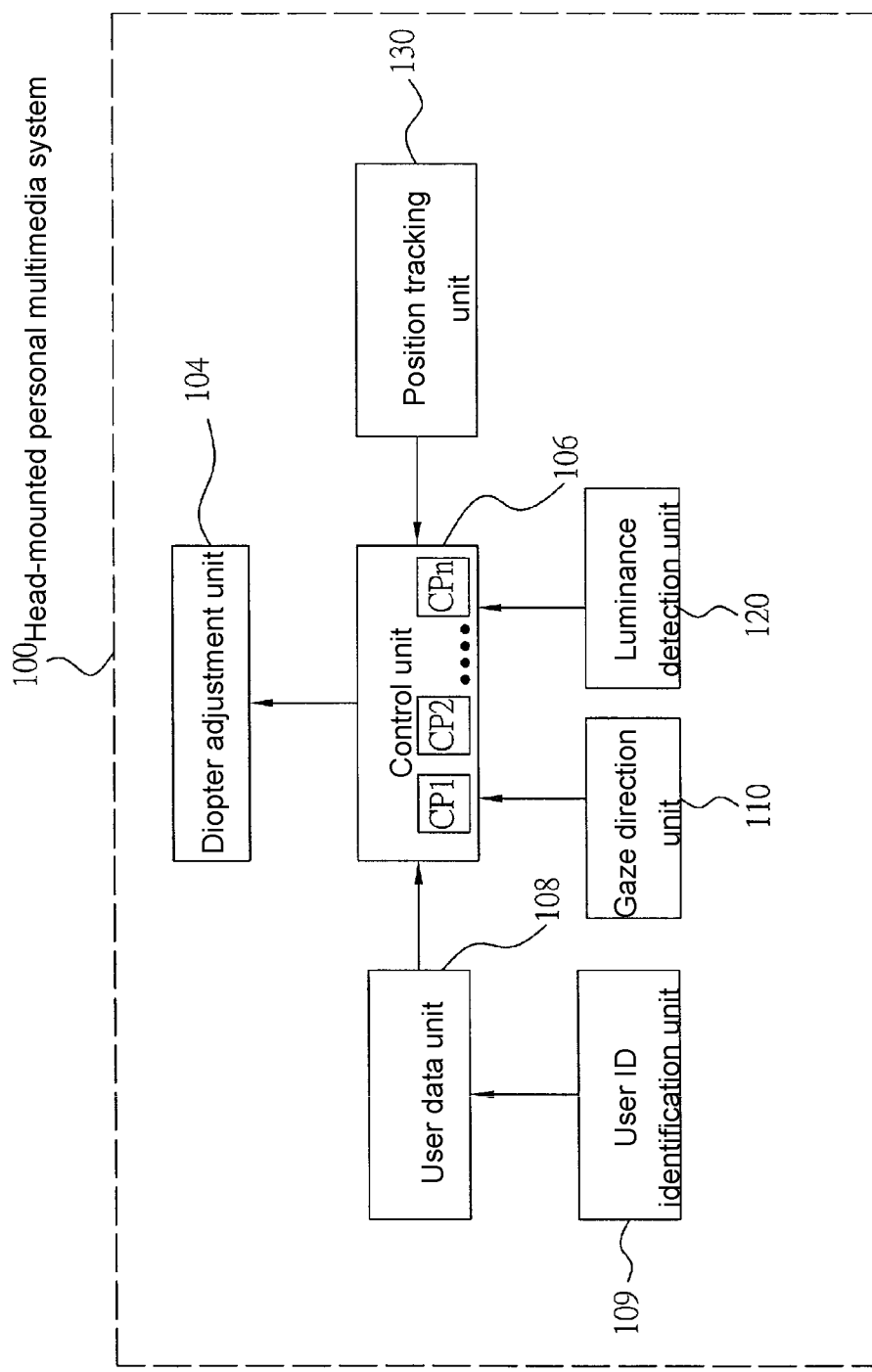
FIG. 12 is showing a function block diagram of a head-mounted personal multimedia system according to an embodiment of the present invention.

FIG. 12 shows a block diagram of the function of the head-mounted personal multimedia system 100. Operations of the head-mounted personal multimedia system 100 are to be further given with FIG. 12, and parts not directly associated with the present invention are omitted herein.

The head-mounted personal multimedia system 100 selectively further includes a user data unit 108, which has a memory for storing one or multiple sets of user data. The user data unit 108 first indexes user names or user identities (IDs). For each user, the corresponding user data that the user data unit 108 stores for this user may include age, gender, eye disease data (e.g., the degree of myopia) and/or user preferences. It is understood that, similar to the control unit 106, the user data unit 108 may be implemented at a local end or at a remote end. In one embodiment, the user data unit 108 may be integrated in the control unit 106.

The head-mounted personal multimedia system 100 further includes a user ID identification unit 109, which, for example, identifies the name or ID of the user through fingerprints of the user or requesting the user to enter a password. It should be noted that, the user data unit 108 or the user ID identification unit 109 may also be implemented through the mobile phone 300. Corresponding details may be referred from Touch ID used on Apple iPhone. It is understood that, a fingerprint recognition device 109 similar to Touch ID may also be directly disposed on the frame 102, as shown in FIG. 10.

In one embodiment, when the user starts using the head-mounted personal multimedia system 100, the ID of the user is first identified by the user ID identification unit 109, and the user data unit 108 verifies the user data corresponding to the user according to the ID of the user and provides the user data to the control unit 106. According to the verified user data, the control unit 106 selects an appropriate control profile, e.g., a control file CP1, from multiple pre-loaded control profiles CP1 to CPn. When the user views an image, the control unit 106 further determines the diopter that it is to control the diopter adjustment unit 104 to provide from the control profile (e.g., implemented by a look-up table (LUT)) according to data currently being accessed (e.g., data fed in by the gaze detection unit 110 or the luminance detection 120, with associated details to be given shortly). It is anticipated that, the diopter the diopter adjustment unit 104 provides dynamically changes as the data the control unit 106 obtains differs or changes.

In one embodiment, particularly in one embodiment where the control unit 106 is simultaneously implemented as a multimedia player, the control unit 106 may pre-load data of distribution statuses and corresponding depths of image elements in an image that the user views. Thus, according to the gaze direction of the user as detected by the gaze detection unit 110, the control unit 106 may determine which image elements in the image that the user focuses on—associated details may be referred from the U.S. Pat. No. 6,456,262B1. The control unit 106 may selectively pre-load image histogram data of pixels of an image the user views as luminance data of the image, or as luminance data of particular regions in the image.

Figure 13A:
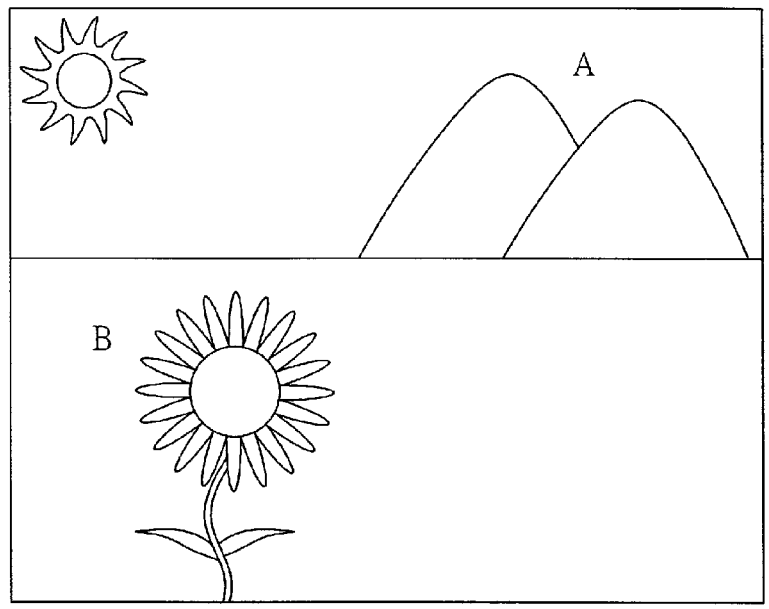
FIGS. 13a and 13b are showing images having different luminance presented by a head-mounted personal multimedia system according to an embodiment of the present invention.
Figure 13B:
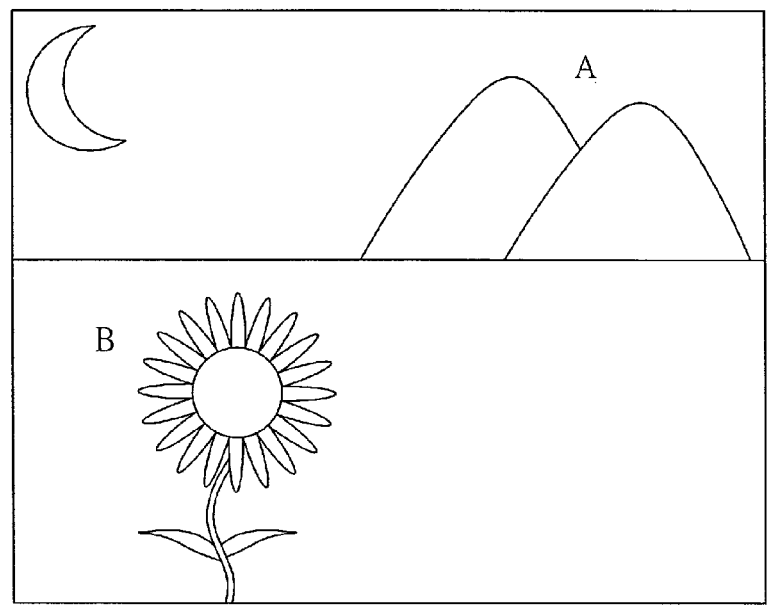

Referring to FIG. 13*a* and FIG. 13*b*, images shown in FIG. 13*a* and FIG. 13*b* are similar, both having an object A and an object B. FIG. 13*a* shows a daylight scene, i.e., the average luminance of the image is higher. In contrast, FIG. 13*b* shows a nighttime scene, i.e., the average luminance of the image is lower. It is understood that, images shown in FIG. 13*a* and FIG. 13*b* may be digital photographs (e.g., a panoramic photograph) or a frame of a video.

FIG. 13*a* is to be first described. In the image, the object A and the object B are present, with the depth of the object A set to be greater than the depth of the object B. In other words, the object A is set as a far scene and the object B is set as a near scene, relatively speaking. In an embodiment, the control unit 106 further performs scene recognition on the image to generate the depth information of the object A and the object B in the image. For example, the object A is recognized as a mountain and thus is automatically set as a far scene and assigned a greater depth accordingly.

When the control unit 106 determines that the user focuses on the object A set as a far scene in the image according to the detection result of the gaze detection unit 110, the control unit 106 determines the diopter, e.g., 2.5 D, it is to control the diopter adjustment unit 104 to provide according to the control profile CP1. When the control unit 106 determines that the user focuses on the object B set as a near scene in the image, the control unit 106 determines the diopter, e.g., 1.25 D, it is to control the diopter adjustment unit 104 to provide according to the control profile CP1.

It should be noted that, respective distances from the object A and the object B to the eyes of the user, i.e., a distance from the display surface to the eyes of the user, are substantially the same. Thus, when the diopter 2.5 D provided by the diopter adjustment unit 104 allows the user to clearly see the object A, the user is theoretically also able to clearly see the object B without having to adjust the diopter to 1.25 D. However, at this point, the focal length of the crystalline lens is kept the same focal length. With the above embodiment of the present invention, when the user focuses on the object A set as a far scene, the eyes are caused to adjust to a lower diopter because the diopter adjustment unit 104 provides a diopter having a greater focusing capability, as if the eyes are viewing a far scene in the real world. In contrast, when the user focuses on the object B set as a near scene, the eyes are caused to adjust to a greater diopter because the diopter adjustment unit 104 provides a diopter having a smaller focusing capability, as if the eyes are viewing a near scene in the real world. Further, as the object or the region that the user focuses on changes, the diopter provided by the diopter adjustment unit 104 also changes, and so the focal length of the crystalline lens is also caused to change instead of being kept at a constant focal length, thereby alleviating eye fatigue. Further, it is understood that, the diopter may be a positive or negative value—a positive value of the diopter indicates the presence of a focusing capability, and a negative value of the diopter indicates an opposite effect, i.e., a dispersing capability. For example, the focusing capability corresponding to a diopter +6.00 D is greater than the focusing capability corresponding to a diopter +3.00 D, the focusing capability corresponding to a diopter +2.00 D is greater than the focusing capability corresponding to a diopter −3.00 D, and the focusing capability corresponding to a diopter −3.00 D is greater than the focusing capability corresponding to a diopter −5.00 D.

FIG. 13b is similar to FIG. 13a, and the same repeated details are omitted herein. One difference between them is that, the image of FIG. 13b has a lower luminance, and so the diopter adjustment unit provides a diopter having a smaller focusing capability to cause the eyes to adjust to a diopter having a greater focusing capability, as if the eyes are viewing at the nighttime of the real world. Accordingly, when the control unit 106 similarly determines that the user focuses on the object A set as a far scene, the control unit 106 at this point determines the diopter, e.g., 1.5 D, it is to control the diopter adjustment unit 104 to provide according to the control profile CP1, with the focusing capability of the diopter 1.5 D being lower than that of the diopter 2.5 D provided when the user focuses on the object A in FIG. 13a (of the daylight). When the control unit 106 similarly determines that the user focuses on the object B set as a near scene in the image, the control unit 106 at this point determines the diopter, e.g., 0.25 D, it is to control the diopter adjustment unit 104 to provide according to the control profile CP1, with the focusing capability of the diopter 0.25 D being lower than that of the diopter 1.25 D provided when the user focuses on the object A in FIG. 13a (of the daylight).

The examples in FIG. 13a and FIG. 13b are based on the same user. For different users, the control unit 106 may select different control profiles, e.g., a control profile CP2. For example, when it is similarly determined that another user focuses on the object A set as a far scene in the image in FIG. 13a, the control unit 106 determines the diopter, e.g., 3D instead of 2.5 D in the foregoing example, it is to control the diopter adjustment unit 104 to provide according to the control profile CP2. When the control unit 106 determines that the user focuses on the object B set as a near scene in the image in FIG. 13a, the control unit 106 determines the diopter, e.g., 1.5 D instead of 1.25 D in the foregoing example, it is to control the diopter adjustment unit 104 to provide according to the control profile CP2.

It should be noted that, in the examples in FIG. 13a and FIG. 13b, the control unit 106 determines the diopter it is to control the diopter adjustment unit 104 to provide according to the average luminance of the entire image. In another embodiment, the control unit 106 may determine a region in the image that the user focuses on (i.e., a region of interest (ROI)) according to the detection result of the gaze detection unit 110. Thus, the control unit 106 may also determine the diopter it is to control the diopter adjustment unit 104 to provide according to the average luminance of the ROI (instead of the entire image).

In another embodiment, the control unit 106 does not pre-load the luminance information of the image. As such, the control unit 106 may be connected to the luminance detection unit 120, and generate luminance data according to a metering result of the luminance detection unit 120. Such method is beneficial for application scenarios of AR or MR because the eyes of the user further sense external ambient light beams in addition to the luminance of the image. As previously described, preferably, the luminance detection unit 120 may target at parts in the display surface that are closer to the eyes to perform metering.

Further, in one embodiment, each of the control profiles CP1-CPn may specify a variable range and a variance sensitivity (the magnitude that the diopter increases or decreases per unit time) of the diopter. The reason for such is that, too drastic or too fast adjustment in the diopter may cause discomforts for some users. For example, the diopter that the diopter adjustment unit 104 provides according to the control profile CP1 may be set to vary within a range between +0 D and +9.00 D, and the variance magnitude may be set to not exceed 1 D per second. However, the diopter that the diopter adjustment unit 104 provides according to the control profile CP2 may be set to vary within a range between +0.25 D and +8.00 D, and the variance magnitude may be set to not exceed 0.75 D per second. In general, a moderate variance is preferably set for presbyopia of the elderly.

It should be noted that, in practice, values of the parameters in each of the control profiles CP1-CPn may be designed with consideration of hardware restrictions of the diopter adjustment unit 104 as well as user needs and preferences, or may be designed according to optometry and correction results, and are not limited by the present invention. Further, in an embodiment where the diopter adjustment unit 104 individually adjusts for left and right eyes, each of the parameters in each of the control profiles CP1-CPn may be include different setting values for left and right eyes—such approach is preferred because degrees of myopia for left and right eyes of a user are usually different, for example.

Further, for a myopic user, the diopter that the diopter adjustment unit 104 provides may be designed to vary within a range between −3.00 D and +6.00 D. Thus, basic myopic degrees may be corrected at the same time to allow the user to apply the head-mounted personal multimedia system 100 without wearing glasses. In another embodiment, the diopter that the diopter adjustment unit 104 provides is still set to vary within a range between 0 D and +9.00 D. However, in this case, the head-mounted personal multimedia system 100 may additionally provide a correction lens (not shown) that can be inserted or removed as desired on an optical path to provide a diopter, e.g., −3.00 D. Therefore, the total diopter that the diopter adjustment unit 104 and the correction lens (when inserted in an optical path) jointly provide varies within a range between −3.00 D and +6.00 D. It should be noted that, the diopter a correction lens provides is usually a constant value, whereas the diopter adjustment unit 104 may provide a dynamically changing diopter. In another embodiment, an approach of the CN205038406 U or CN 205103492 U may also be referred and applied to correct a basic degree of myopia.

In another selective embodiment, as shown in FIG. 12, the head-mounted personal multimedia system 100 further includes a position tracking unit 130. When the user applies the head-mounted personal multimedia system 100, the position tracking unit 130 may detect head movements of the user, particularly but not limited to, forward and backward head movements of the user. Implementation details of the position tracking unit 130 may be referred from Oculus Rift or HTC Vive, or US20090237355, and are not limited by the present invention.

The movement data detected by the position tracking unit 130 is also fed to the control unit 106 as parameters for the control unit 106 control the diopter adjustment unit 104. In this embodiment, the position tracking unit 130 primarily assists the gaze detection unit 110. When the two are applied in coordination, the control unit 106 is capable of more accurately determine the object that the user focuses on to determine a more appropriate diopter. For example, assuming that the position tracking unit 130 detects that the head of the user is tilted forward, the control unit 106 may accordingly determine that the user wishes to more carefully view the object as a near scene in the image; assuming that the position tracking unit 130 detects that the user continues walking towards a front-left direction, the control unit 106 may accordingly determine that the user is interested in the object at the left in the image.

Further, the depth of the object in the image originally set may be correspondingly changed according to the direction and distance of the user detected by the position tracking unit 130; that is, an object originally set as a far scene may gradually get "close to" the user to become a near scene. Thus, the diopter the diopter adjustment unit 104 provides may be correspondingly adjusted and reduced (i.e., the eyes are caused to adjust to a diopter having a greater focusing capability). Meanwhile, the control unit 106 may further appropriately control the variance magnitude of the diopter the diopter adjustment unit 104 provides according to a moving speed of the user.

Further, selectively, in an embodiment where the control unit 106 is also implemented as a multimedia player, the control unit 106 is further signally connected to and controls the display screen 150. When the control unit 106 controls the diopter adjustment unit 104 to provide different diopters, in response to the issue of a spectacle magnification change, it at the same time controls the display screen 150 to zoom in or zoom out the image provided to the user by different display regions. Taking FIG. 13*a* for example, the control unit 106 initially determines that the user focuses on the object B set as a near scene in the image, and controls the diopter adjustment unit 104 to provide a diopter, e.g., −2.5 D. When the control unit 106 later determines that the user switches to focus on the object A set as a far scene in the image, it controls the diopter adjustment unit 104 to provide a diopter, e.g., 3.5 D. However, compared to a diopter −2.5 D, the control unit 106 at this point also controls the display screen 150 to provide the user with a smaller image (e.g., by turning off (or displaying black by) the pixels at an outer periphery of the display screen 150 and displaying the image by only central pixels, or decreasing the viewable area of the image through other methods) to counteract an enlarging effect caused by the increased diopter. In general, a 1 D change in the diopter produces 1.5% magnification change. That is to say, when the user views the object B (with the diopter set as −2.5 D) set as a near scene and suddenly views the object A (with the diopter set as 3.5 D) set as a far scene, a variance of 6 D is resulted. Without any adjustment, the image perceived by the user is suddenly enlarged by 9%, and so the image on the screen needs to be instantaneously reduced by 9% to counteract such effect. It is understood that, the level of magnification change caused by the diopter differs based on individuals and the devices applied, and so the scaling (zooming in/out) ratio actually performed on the image on the screen is only accurate through personalized correction.

In another embodiment, the display screen 150 further includes a stepping motor (not shown) to fine tune the distance between the display surface and the eyes of the user. Again taking FIG. 13*a* for example, when the user views the object B (with the diopter set as −2.5 D) set as a near scene and suddenly views the object A (with the diopter set as 3.5 D) set as a far scene, a variance of 6 D is resulted. Without any adjustment, the image perceived by the user is suddenly enlarged by 9%. In this embodiment, the control unit 106 further controls the display screen 150 to increase the distance between its display surface and the eyes of the user (e.g., by 1 cm) to counteract such enlarging effect. Similarly, as previously described, the level of magnification change caused by the diopter differs based on individuals and the devices applied, and so the scaling (zooming in/out) ratio actually performed on the image on the screen is only accurate through personalized correction.

The present invention can be embodied in any other specific manners without departing from the spirit or essential features of the present invention. Every aspect of the aforesaid embodiments of the present invention must be deemed illustrative rather than restrictive of the present invention. Hence, the scope of the present invention is defined by the appended claims instead of the above description. All equivalent meanings and scope which fall within the appended claims must be deemed falling within the scope of the appended claims.

What is claimed is:

1. A head-mounted personal multimedia system, comprising:
   a display unit, providing a fixed display surface to display an image to a user;
   a gaze detection unit, detecting a gaze direction of at least one eye of the user towards the image;
   a diopter adjustment unit, located between the fixed display surface and the eye, configurably providing at least one first diopter or a second diopter to the eye for viewing; and
   a control unit, signally connected to the diopter adjustment unit and the gaze detection unit, controlling the diopter adjustment unit according to the gaze direction detected by the gaze detection unit to provide the first diopter or the second diopter;
   wherein the control unit is further signally connected to the display unit, wherein when the control unit controls the diopter adjustment unit to provide the first diopter, the control unit further controls the display unit to display the image with a first magnification, and wherein when the control unit controls the diopter adjustment unit to provide the second diopter, the control unit further controls the display unit to display the image with a second magnification.

2. The head-mounted personal multimedia system according to claim 1, wherein the control unit further controls the diopter adjustment unit to provide the first diopter or the second diopter according to luminance information of the image.

3. The head-mounted personal multimedia system according to claim 2, further comprising:
   a luminance detection unit, signally connected to the control unit, detecting luminance of at least one region in the fixed display surface to generate and provide the luminance information of the image to the control unit.

4. The head-mounted personal multimedia system according to claim 1, wherein the control unit further determines values of the first diopter and the second diopter according to depth information of the image.

5. The head-mounted personal multimedia system according to claim 4, wherein the control unit further performs scene recognition on the image to generate the depth information of the image.

6. The head-mounted personal multimedia system according to claim 1, further comprising:
   a user data unit, storing a plurality of sets of user data and determining corresponding user data according to a user identity (ID);
   wherein, the control unit is further signally connected to the user data unit, and further determines values of the first diopter and the second diopter according to the corresponding user data the user data unit determines.

7. The head-mounted personal multimedia system according to claim 6, further comprising a user ID identification unit for identifying the user ID.

8. The head-mounted personal multimedia system according to claim 1, wherein the display unit is configured to display a video, and the image is a part of the video.

9. The head-mounted personal multimedia system according to claim 1, wherein the control unit further controls the diopter adjustment unit to provide the first diopter or the second diopter in response to a head movement of the user.

10. The head-mounted personal multimedia system according to claim 1, wherein when the control unit controls the diopter adjustment unit to provide the first diopter, the control unit further controls the display unit to display the image by using a first display region, and wherein when the control unit controls the diopter adjustment unit to provide the second diopter, the control unit further controls the display unit to display the image by using a second display region.

11. The head-mounted personal multimedia system according to claim 10, wherein a focusing capability corresponding to a value of the first diopter is greater than a focusing capability corresponding to a value of the second diopter, and a viewable area of the first display region is smaller than a viewable area of the second display region.

12. A visual assistance device, detachably installed in a head-mounted personal multimedia system, the head-mounted personal multimedia system comprising a display unit to provide a fixed display surface for displaying an image to a user, the visual assistance device comprising:
 a gaze detection unit, detecting a gaze direction of at least one eye of the user towards the image;
 a diopter adjustment unit, located between the fixed display surface and the eye, configurably providing at least one first diopter or a second diopter to the eye for viewing; and
 a control unit, signally connected to the diopter adjustment unit and the gaze detection unit, controlling the diopter adjustment unit according to the gaze direction detected by the gaze detection unit to provide the first diopter or the second diopter;
 wherein the control unit is further signally connected to the display unit, wherein when the control unit controls the diopter adjustment unit to provide the first diopter, the control unit further controls the display unit to display the image with a first magnification, and wherein when the control unit controls the diopter adjustment unit to provide the second diopter, the control unit further controls the display unit to display the image with a second magnification.

13. A visual assistance device, detachably installed in a head-mounted personal multimedia system, the head-mounted personal multimedia system comprising a display unit to provide a fixed display surface for displaying an image to a user, and a gaze detection unit for detecting a gaze direction of at least one eye of the user towards the image, the visual assistance device comprising:
 a diopter adjustment unit, located between the fixed display surface and the eye, configurably providing at least one first diopter or a second diopter to the eye for viewing; and
 a control unit, signally connected to the diopter adjustment unit and the gaze detection unit, controlling the diopter adjustment unit according to the gaze direction detected by the gaze detection unit to provide the first diopter or the second diopter;
 wherein the control unit is further signally connected to the display unit, wherein when the control unit controls the diopter adjustment unit to provide the first diopter, the control unit further controls the display unit to display the image with a first magnification, and wherein when the control unit controls the diopter adjustment unit to provide the second diopter, the control unit further controls the display unit to display the image with a second magnification.

14. The head-mounted personal multimedia system according to claim 1, wherein the gaze detection unit, the diopter adjustment unit, and the control unit together are formed as a visual assistance device and detachably installed in the head-mounted personal multimedia system.

15. The head-mounted personal multimedia system according to claim 1, wherein the diopter adjustment unit and the control unit together are formed as a visual assistance device and detachably installed in the head-mounted personal multimedia system.

* * * * *